United States Patent
Tomasoni et al.

(10) Patent No.: US 11,290,224 B2
(45) Date of Patent: Mar. 29, 2022

(54) METHOD OF OPERATING A RADIO TRANSMITTER AND CORRESPONDING RADIO TRANSMITTER

(71) Applicant: STMICROELECTRONICS S.R.L., Agrate Brianza (IT)

(72) Inventors: Alessandro Tomasoni, Sotto il Monte Giovanni XXIII (IT); Daniele Lo Iacono, Bergamo (IT); Fabio Osnato, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/868,422

(22) Filed: May 6, 2020

(65) Prior Publication Data
US 2020/0358566 A1    Nov. 12, 2020

(30) Foreign Application Priority Data

May 7, 2019   (IT) .................. 102019000006609

(51) Int. Cl.
*H04L 5/00* (2006.01)
*H04B 1/04* (2006.01)
(Continued)

(52) U.S. Cl.
CPC .......... *H04L 5/0007* (2013.01); *H04B 1/04* (2013.01); *H04B 1/06* (2013.01); *H04L 27/36* (2013.01);
(Continued)

(58) Field of Classification Search
CPC ....... H04L 27/38; H04L 5/0007; H04L 27/36; H04B 1/69; H04B 1/06; H04B 1/04; H04W 84/12
(Continued)

(56) References Cited

U.S. PATENT DOCUMENTS

| 8,933,592 | B2 | 1/2015 | Aiello |
| 9,118,250 | B2 | 8/2015 | Aiello et al. |

(Continued)

FOREIGN PATENT DOCUMENTS

| EP | 3 389 317 A1 | 10/2018 |
| TW | 201843954 A | 12/2018 |

OTHER PUBLICATIONS

Djiroun, F., et al., "MAC protocols with wake-up radio for wireless sensor networks: a review," IEEE Communications Surveys & Tutorials, vol. 19, No. 1, pp. 587-618, 2017.

(Continued)

*Primary Examiner* — Emmanuel Bayard
(74) *Attorney, Agent, or Firm* — Seed IP Law Group LLP (57) ABSTRACT

A method of operating a radio transmitter configured to transmit at least one sequence of logic values by transmitting transmission signals selected in a constellation diagram having a certain cardinality comprises selecting said transmission signals out of a first subset of transmission signals in said constellation diagram, said first subset comprising a first number of transmission signals, and a second subset of transmission signals in said constellation diagram, said second subset comprising a second number of transmission signals, wherein. The transmission signals in the second subset of transmission signals have an energy higher than the transmission signals in the first subset of transmission signals. The sum of said first number of transmission signals and said second number of transmission signals is less than said cardinality.

20 Claims, 5 Drawing Sheets

(51) Int. Cl.
    *H04B 1/06*     (2006.01)
    *H04L 27/36*    (2006.01)
    *H04W 52/02*    (2009.01)
    *G16Y 10/75*    (2020.01)
    *H04W 84/12*    (2009.01)

(52) U.S. Cl.
    CPC ......... *H04W 52/0235* (2013.01); *G16Y 10/75* (2020.01); *H04W 84/12* (2013.01)

(58) Field of Classification Search
    USPC .......................... 375/141, 295, 297, 298, 340
    See application file for complete search history.

(56) References Cited

U.S. PATENT DOCUMENTS

| | | | |
|---|---|---|---|
| 9,461,534 B2 | 10/2016 | Larosa et al. | |
| 2009/0279620 A1* | 11/2009 | Schenk | H04L 27/0008 375/260 |
| 2010/0002751 A1* | 1/2010 | Dent | H04L 27/3416 375/141 |
| 2011/0051852 A1* | 3/2011 | Khayrallah | H04L 25/03305 375/320 |
| 2011/0051853 A1* | 3/2011 | Khayrallah | H04L 25/067 375/340 |
| 2015/0207609 A1* | 7/2015 | Nam | H04L 5/0026 370/329 |
| 2016/0156498 A1* | 6/2016 | Loghin | H04L 1/0003 375/298 |
| 2018/0083824 A1* | 3/2018 | Yang | H04L 27/186 |
| 2018/0091959 A1* | 3/2018 | Sun | H04W 88/04 |
| 2018/0192373 A1 | 7/2018 | Fang et al. | |
| 2019/0082390 A1 | 3/2019 | Azizi et al. | |
| 2019/0140779 A1* | 5/2019 | Jia | H04L 5/003 |
| 2020/0059342 A1 | 2/2020 | Sahin et al. | |
| 2020/0259607 A1* | 8/2020 | Xi | H04L 1/0005 |
| 2020/0287570 A1* | 9/2020 | Peng | H03M 13/3761 |

OTHER PUBLICATIONS

Huang, X., et al., "A 915 MHz ultra-low power wake-up receiver with scalable performance and power consumption", Proceedings of the ESSCIRC (ESSCIRC), Helsinki, 2011, 4 pages.

Hwang, S., et al., "IEEE P802.11ba™/D1.1—Part 11: Wireless LAN Medium Access Control—Amendment 9: Wake-Up Radio Operation," IEEE Standards Activities Department, 2018, pp. 880-882.

Tang, S., et al., "Exploiting burst transmission and partial correlation for reliable wake-up signaling in Radio-On-Demand WLANs", Proceedings of IEEE International Conference on Communications (ICC), Ottawa, 2012, 6 pages.

Yomo, H., et al., "Receiver design for realizing on-demand WiFi wake-up using WLAN signals", Proceedings of IEEE Global Communications Conference (GLOBECOM), Anaheim, 2012, 6 pages.

* cited by examiner

METHOD OF OPERATING A RADIO TRANSMITTER AND CORRESPONDING RADIO TRANSMITTER

BACKGROUND

Technical Field

The description relates to Wake-up Radio (WuR) systems for use, for instance, with battery-operated devices such as wireless nodes as increasingly employed in wireless networks, e.g., in the context of the Internet of Things (IoT).

In particular, one or more embodiments may relate to generating and transmitting waveforms targeting wake-up radio receivers (e.g., simple, low-cost and low-power radio receivers) for activation thereof.

Description of the Related Art

With increasing sizes of wireless device networks, energy-efficient operation (e.g., communication) of the wireless nodes in these networks may become relevant to facilitate sustainability and scalability thereof.

A first approach towards reduction of the power consumption of wireless nodes involves keeping the nodes in a standby mode (i.e., in a low-power state) and periodically "waking up" the nodes to enable them to perform their function (e.g., listening for data transmission in case the node is a radio device). This approach is commonly used in low-duty cycle applications, but may not be suitable in case of low-latency requirements. Moreover, synchronization and sizing of the wake-up window(s) may affect the overall performance of the wireless network in terms of power consumption and/or reliability.

A second approach towards reduction of the power consumption of wireless nodes is the use of Wake-up Radio (WuR) systems. In WuR systems, a wake-up radio receiver (WuRx) is coupled to or implemented in a wireless device (e.g., a main radio adapted to receive and transmit signals, a sensor or an actuator), and allows the device to remain in a standby mode until a communication is destined to the device. The device can be remotely activated by a wake-up radio transmitter (WuTx) sending a wake-up call signal intended for the WuRx associated to the targeted device. The activated node then goes into a fully operational, full-power state, performs its function and eventually returns to standby mode until another wake-up call signal is received at the respective WuRx.

Therefore, a WuRx may act as a wireless switch having the (only) task of waking up (upon request) the main device coupled thereto. In case the main device is a radio, waking up may be employed when transmission of data is about to start. In case the main device is a (low-power) sensor or actuator, operation of the WuRx may additionally involve processing few bits or bytes of information (e.g., a digital key for a smart door lock) received with the wake-up call signal.

Performance indicators of wake-up radio receivers are power consumption, sensitivity, latency and probability of missed/false detection.

The following is a list of documents exemplary of the extensive activity devoted to WuR systems and related technology:

[1] F. Z. Djiroun and D. Djenouri, "MAC protocols with wake-up radio for wireless sensor networks: a review," *IEEE Communications Surveys & Tutorials*, vol. 19, no. 1, pp. 587-618, 2017;

[2] X. Huang, P. Harpe, G. Dolmans and H. d. Groot, "A 915 MHz ultra-low power wake-up receiver with scalable performance and power consumption," in *Proceedings of the ESSCIRC (ESSCIRC)*, Helsinki, 2011;

[3] 802.11 Working Group, "IEEE P802.11ba™/D1.1—Part 11: Wireless LAN Medium Access Control—Amendment 9: Wake-Up Radio Operation," IEEE Standards Activities Department, 2018;

[4] S. Tang, H. Yomo, Y. Kondo and S. Obana, "Exploiting burst transmission and partial correlation for reliable wake-up signaling in Radio-On-Demand WLANs," in *Proceedings of IEEE International Conference on Communications (ICC)*, Ottawa, 2012; and

[5] H. Yomo, Y. Kondo, N. Miyamoto, S. Tang, M. Iwai and T. Ito, "Receiver design for realizing on-demand WiFi wake-up using WLAN signals," in *Proceedings of IEEE Global Communications Conference (GLOBECOM)*, Anaheim, 2012.

BRIEF SUMMARY

Despite the extensive activity in the area, further improved solutions are desirable.

An object of one or more embodiments is to contribute in providing such improved solutions.

According to one or more embodiments, such an object can be achieved by means of a method having the features set forth in the claims that follow.

One or more embodiments may relate to a corresponding radio transmitter.

The claims are an integral part of the technical teaching provided herein in respect of the embodiments.

One or more embodiments may provide a method of operating a WuR system wherein a simple WuRx adapted to demodulate amplitude-modulated signals (e.g., On-Off Keying, OOK, signals) can be woken up by a waveform generated by a conventional (e.g., commercial, off-the-shelf) IEEE 802.11 Wi-Fi transmitter involving Orthogonal Frequency Division Multiplexing (OFDM).

Therefore, one or more embodiments may provide a method of operating a WuR system which may not need a proprietary wake-up radio transmitter. Additionally, one or more embodiments may provide a WuR system which may not need a gateway to translate the signal into a proprietary wake-up sequence.

One or more embodiments may thus facilitate interoperability (e.g., between transmitter and receiver) of devices developed by different manufacturers.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

By way of introduction to a detailed description of exemplary embodiments, one may first refer to documents [1]-[5] previously cited.

Reference documents such as [1] and [2] relate to Medium Access Control (MAC) protocols and/or efficient hardware implementations of wake-up radio receivers. The low-power requirements may result in severe constraints on power amplifiers, filters and oscillators. For instance, if a power amplifier is not needed, the whole processing may be performed at radio frequency (RF) instead of intermediate frequency (IF); ring oscillators may be used in place of tunable ones to save energy; envelope detectors may be used to avoid a fully-digital baseband, and so on. Although these choices may have an impact on the performance of a WuR system, e.g., in terms of power consumption and/or sensitivity, they involve acting at the design level of the implementation of the WuR receiver.

At the system level, it is noted that most of the WuR systems involve proprietary solutions, i.e., they include a proprietary wake-up radio transmitter adapted to generate a specific waveform for the WuRx. Therefore, proprietary WuR systems of this kind may work (only) in bundle and may not offer vendor interoperability.

In this context, it is noted that some standardization attempts are currently ongoing, e.g., in IEEE with the IEEE 802.11ba draft amendment [3]. Such amendment proposes some modifications at both physical layer and medium access control (MAC) layer. Therefore, prior art devices according to IEEE 802.11 specification would need a re-design or in a few cases (e.g., those devices based on Software-Defined Radio implementation) a firmware upgrade. A new WuR receiver complying with IEEE 802.11ba may be integrated in a new IEEE 802.11 chip or provided as a companion chip. In any case, it may operate only as a part of a main Wi-Fi radio, which would be a part of that kind of system.

Documents [4] and [5] propose alternative WuR systems based on transmission of frames (i.e., messages) of different length complying with the IEEE 802.11 specification, namely the frame length modulation. In these cases, the information is carried by the length of the frame. By transmitting frames with L different lengths, every frame may carry at most $\log_2(L)$ bits. The WuR systems of [4] and [5] may provide poor performance in case of congested networks and/or low signal-to-noise ratio (SNR). In the former case, other transmitters may access the channel between two or more frames sent to the WuRx; in the latter case, the estimation of the frame length may be challenging, and may result in the receiver erroneously discarding a frame addressed thereto. The former type of error is typically referred to as insertion error, while the latter is typically referred to as deletion error.

Advantageously over the prior art, embodiments of the present disclosure may relate to generating, by means of an otherwise conventional (e.g., commercial) Wi-Fi transmitter involving OFDM modulation and QAM symbols, a waveform which may be interpreted by an IEEE 802.11 "legitimate" receiver (e.g., an access point) as a valid IEEE 802.11 signal, and by a target WuR receiver as an amplitude-modulated signal (e.g., an OOK modulated signal) carrying a valid wake-up call signal.

Therefore, one or more embodiments may involve a conventional Wi-Fi transmitter complying with any amendment of the IEEE 802.11 standard based on OFDM modulation, e.g., the IEEE 802.11g, 802.11a, 802.11n, 802.11ac and 802.11ax. In one or more embodiments, a wake-up call signal (or waveform) may be generated by feeding a conventional Wi-Fi transmitter (such as, for instance, a Wi-Fi transmitter in a smart phone) with a certain sequence of bits specifically designed for this purpose.

In one or more embodiments, the energy level (e.g., low or high) carried by each OFDM symbol within an IEEE 802.11 frame comprised in a wake-up call waveform may be indicative of a digital value (e.g., 0 or 1, respectively). Therefore, throughput of a wake-up call waveform according to exemplary embodiments may be around 1 bit per OFDM symbol (or 0.5 bit per OFDM symbol, e.g., in case Manchester coding is applied to the bit sequence).

Figure 1:
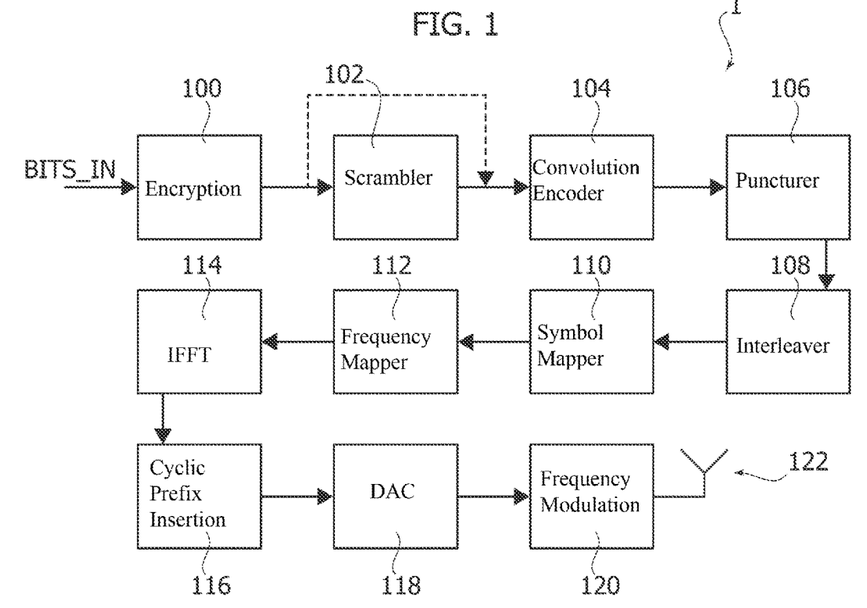
FIG. 1 is a block diagram exemplary of a processing flow of a conventional Wi-Fi transmitter.

By way of introduction to a detailed description of exemplary embodiments, reference may first be had to FIG. 1.

FIG. 1 illustrates a block diagram of a processing flow of IEEE 802.11 Wi-Fi transmitter 1 involving Orthogonal Frequency Division Multiplexing (OFDM) modulation. The flow is the same as in a conventional IEEE 802.11 Wi-Fi transmitter 1 involving OFDM modulation, except for changes discussed below.

For the sake of brevity, the present detailed description may refer to Wi-Fi transmitters implementing the IEEE 802.11g amendment of the IEEE 802.11 standard. However, as previously discussed, one or more embodiments may involve Wi-Fi transmitters implementing different amendments of the IEEE 802.11 standard, e.g., the 802.11a, 802.11n, 802.11ac, 802.11ax standards.

Once a sequence of bits BITS_IN is formed by the MAC layer, the corresponding signal may be processed in the processing chain exemplified by blocks 100-122 in FIG. 1.

An encryption block 100 may provide privacy. Frames can be encrypted according to one of many different protocols (e.g., WEP, WPA, WPA2, WPA3) and encryption engines (e.g., RC4, TKIP, AES). Even if a device is associated with an encrypted network, unencrypted frames may be transmitted. A flag in the MAC header may inform the receiver that the frame is either encrypted or not. In the present detailed description, encryption will be assumed to be disabled. However, one or more embodiments may apply to encrypted communication.

A scrambler block 102 may add (modulo 2) a pseudo-random sequence to the injected sequence of bits BITS_IN, e.g., in order to randomize the transmitted sequence of bits. By way of example, the scrambling sequence may be generated by a feedback register of size 7 and may have period of 127. The scrambling sequence may be completely predictable, provided that the status of the shift register is known. What is unknown is the content of the shift register at the beginning of a new frame, i.e., the "phase" of the pseudo-random sequence xored with the input sequence of bits BITS_IN. For instance, the IEEE 802.11g amendment does not state how the shift register should be randomized at the beginning of a new frame. The initial phase may thus be as random as possible. Therefore, a transmitter may leave a certain number of bits equal to 0 (before the scrambling operation) in known positions, to let the receiver recover the correct phase of the scrambler among the possible ones. For instance, according to the 802.11g standard, 7 null bits are inserted ahead of the payload, and the receiver estimates the correct scrambling phase among the 127 possible ones.

A convolutional encoder 104 (e.g., a Viterbi 64-states encoder) may add redundancy bits to the injected sequence BITS_IN. By way of example, the convolutional encoder 104 may have a code rate Rc=½, may be non-systematic and may have polynomials 133, 171 (in octal representation). The initial state may be 0, and the last six transmitted bits may be 0 as well, for code termination. The code may span all the encoded OFDM symbols, i.e., only the last OFDM symbol may be terminated.

A puncturer block 106 may remove some bits from the output of the convolutional encoder 104 to increase the code rate. For instance, the IEEE 802.11g amendment supports the following code rates: Rc=½(i.e., no puncturing), Rc=⅔ and Rc=¾. Other code rates may be supported by other amendments, such as Rc=⅚ in the 802.11n amendment.

An interleaver block 108 may permute the order of bits of the processed sequence. The interleaver block 108 may follow a deterministic law, e.g., mapping adjacent bits onto different subcarriers and bit positions within the binary labels of modulated symbols. In case of multiple antenna systems, such as in 802.11n multiple-input-multiple-output (MIMO), adjacent bits may be mapped onto different antennas.

A symbol mapper 110 (e.g., a Quadrature Amplitude Modulation, QAM, mapper) may transform an input sequence of b bits into an output modulated symbol selected out of $M_{QAM}=2^b$ possible symbols (in the complex plane), where $M_{QAM}$ is the cardinality of the constellation. The module of the symbol may represent the amplitude of the corresponding waveform, and the angle of the symbol may represent the phase of the sinusoid modulating the waveform. In the IEEE 802.11g standard, symbols may be Binary Phase-Shift Keying (BPSK), Quadrature Phase-Shift Keying (QPSK), 16-QAM or 64-QAM. BPSK represents the typical in-phase binary antipodal transmission, QPSK can be regarded as two BPSK simultaneously transmitted over the I/Q axes. 16-QAM and 64-QAM symbols modulate also the waveform amplitude, shaping a square grid of $M_{QAM}=16$ and $M_{QAM}=64$ points in the complex plane, respectively (see, e.g., FIG. 3 further described in the following).

A frequency mapper 112 may arrange modulated symbols over a subset of carriers, e.g., 48 out of 64 carriers according to the 802.11g standard, 52 out of 64 carriers according to the 802.11n standard, etc. Four additional known symbols may be inserted in predetermined fixed positions, to ease phase noise tracking. The remaining 14 carriers correspond to the DC and to the subcarriers close to the Nyquist frequency, therefore may not be used.

An Inverse Fast Fourier Transform (IFFT) block 114 may perform a conversion to the time domain. It may transform a transmission over a wideband channel into simultaneous transmission of 48 waveforms over as many narrow-band channels. The IFFT size in IEEE 802.11g is 64. Other amendments (e.g., the 802.11n) may involve a different, e.g., larger, number of samples.

A cyclic prefix insertion block 116 may prepend a cyclic prefix to the current OFDM symbol, e.g., by copying the last samples of the OFDM symbol ahead. For instance, this may provide isolation between OFDM symbols, and may implement a circular convolution with the channel. The length of the cyclic prefix in some amendments (like 802.11n) is variable, and may depend on the channel spread (i.e., the number of echoes to tackle).

A digital-to-analog converter (DAC) 118 may convert the digital signal into analog waveform(s). The analog waveforms may be frequency-modulated at a radio-frequency block 120 and may be transmitted by an antenna 122. The system bandwidth may depend on the IEEE standard involved, e.g., 20 MHz for an IEEE 802.11g system, 40 MHz for other amendments, or even more. The carrier frequency may vary as well, e.g., transmitting at 2.4 GHz or 5 GHz.

At the receiver side (not illustrated in the Figures annexed herein), the dual of the above operations 100-122 may be performed in reverse order. A receiver may additionally perform other functions, such as symbol synchronization, frequency offset recovery and channel estimation.

In one or more embodiments, a waveform generated by an otherwise conventional Wi-Fi transmitter (e.g., an IEEE 802.11 transmitter) may be correctly understandable by a Wi-Fi receiver (e.g., an IEEE 802.11 receiver) and by a wake-up radio receiver (WuRx) configured to detect amplitude-modulated signals. For instance, the WuRx may be configured to receive an OOK-modulated signal carrying one bit of information every 4 μs (with 4 μs being also the symbol duration in the IEEE 802.11 OFDM modulation scheme, 1 μs=$10^{-6}$ s).

In known arrangements of "pure" WuR systems based on OOK modulation and involving dedicated, proprietary transmitter-receiver bundles, an OOK transmitter may transmit maximum in-band energy in case of a logical 1, and no energy in case of logical 0 (due to the absence of any constraint regarding the possible constellation mapping). The out-of-band energy would always be null, regardless of the value of the transmitted bit (0 or 1).

Figure 2:
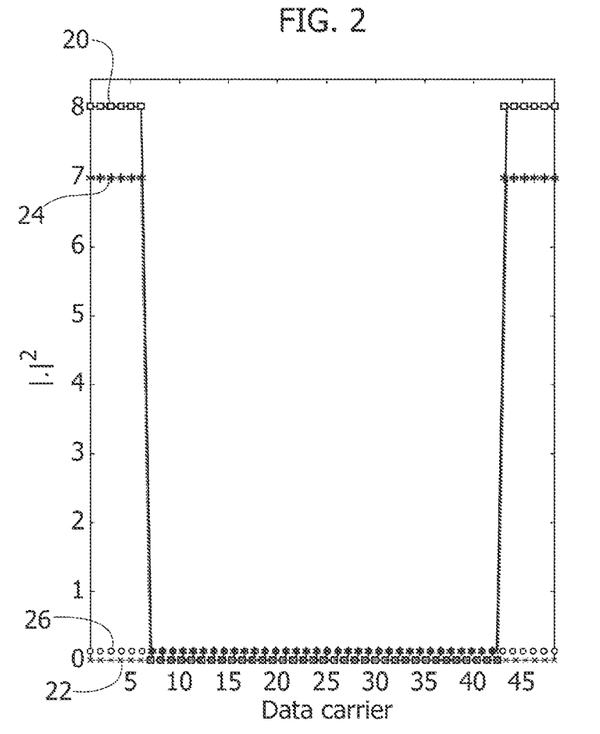
FIG. 2 is a diagram exemplary of a comparison between an unconstrained spectrum and a spectrum constrained to the use of Quadrature amplitude modulation (QAM) symbols for IEEE 802.11g OFDM data carriers suitable for generating a wake-up radio signal in one or more embodiments.

For instance, the lines 20 and 22 in FIG. 2 (indicated with square and cross markers, respectively) are exemplary of the ideal energy levels that such an "unconstrained" WuR transmitter would set for an OOK WuR system exploiting a bandwidth of 13*312.5 kHz=4.06 MHz, corresponding to 13 data carriers in a IEEE 802.11g system (the intra-carrier spacing of 312.5 kHz can be computed dividing the 20 MHz bandwidth by the overall number of 64 carriers). In particular, reference numerals 20 and 22 refer to energy levels corresponding to unconstrained transmission of a bit=1 and a bit=0, respectively.

In one or more embodiments, in the case of WuR systems based on OOK modulation involving a conventional IEEE 802.11 Wi-Fi transmitter, null symbols (i.e., symbols with zero energy) may not be included in the available constellation mapping. Therefore, being the null symbol 0+0j not part of the IEEE 802.11 OFDM standard (e.g., IEEE 802.11g), one or more embodiments may use innermost and outermost symbols available in the constellation diagram, i.e., those symbols with minimal and maximal energy, respectively, to generate OOK-compliant signals.

The corresponding feasible energy patterns (i.e., the constraints due to the symbol mapper 110) are exemplified in FIG. 2 by lines 24 and 26 (indicated with star and circle markers, respectively). In particular, reference numerals 24 and 26 refer to energy levels corresponding to constrained transmission of a bit=1 and a bit=0, respectively.

As exemplified in FIG. 2, in one or more embodiments some amount of energy may be transmitted out-of-band (see, for instance, the data carriers numbered 7 to 42), regardless of the value of the transmitted bit (0 or 1). Such a noise may affect the performance of the analog part of the WuR receiver (e.g., because filters are not sharp due to the severe power constraints). Additionally, when a logical 0 is transmitted, a small amount of energy may be transmitted also in-band (see, for instance, the data carriers numbered 1 to 6 and 43 to 48), reducing the gap between the high-energy and low-energy levels. Anyway, such a reduced gap may not harm the OOK receiver, which may be able to work at very low signal-to-noise ratio (SNR).

Figure 3:
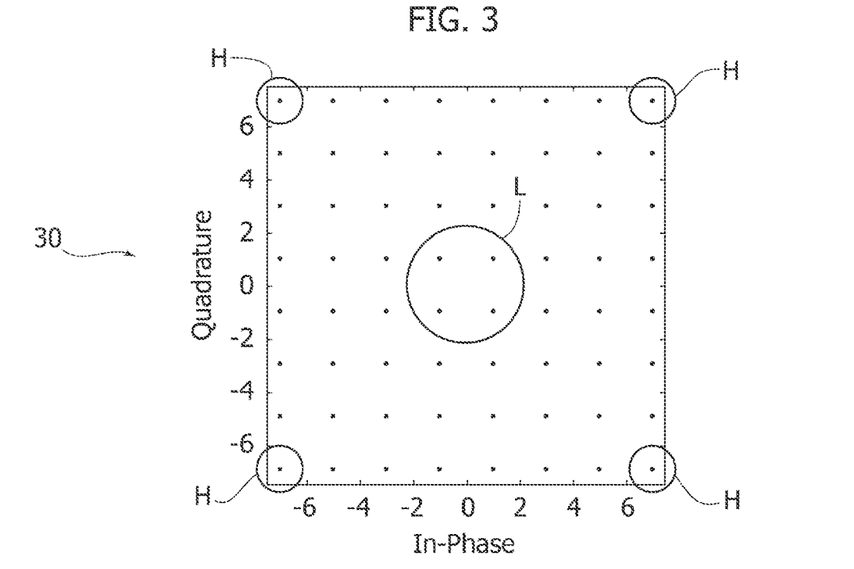
FIG. 3 is exemplary of a constellation diagram for 64-QAM based transmission.

FIG. 3 is a diagram exemplary of the I/Q representation (i.e., the constellation diagram) of a 64-QAM scheme as possibly employed in one or more embodiments, indicated with reference numeral 30 as a whole. Outermost symbols H having a high energy may be used to transmit a logical 1, and innermost symbols L having a low energy may be used to transmit a logical 0. Of course, the embodiments are not limited to the implementation of 64-QAM. For instance, one or more embodiments may involve 16-QAM (possibly resulting in a worse loss, i.e., a greater reduction of the energy gap between high-energy symbols and low-energy symbols), 256-QAM (possibly resulting in a milder loss), or any other modulation scheme supported by the IEEE 802.11 (e.g., specifically 802.11g) standard.

As well known to those of skill in the art, a constellation diagram provides a conventional representation of a signal modulated by a digital modulation scheme such as quadrature amplitude modulation (QAM) or phase-shift keying (PSK). As represented in a constellation diagram a signal is shown as a bi-dimensional scatter diagram (xy) in a complex plane at symbol instants.

It is noted that forthcoming IEEE 802.11 amendments may support power and bit loading, i.e., the ability of adapting the transmitted power and the constellation order to the channel quality, carrier by carrier. Therefore, in one or more embodiments carriers affected by deep fading could be switched-off by the transmitter, thereby facilitating performing quasi-ideal OOK transmission without wasting energy.

In one or more embodiments, Orthogonal Frequency Division Multiple Access (OFDMA) may be used to perform OOK transmission over a subset of subcarriers (e.g., in 802.11ax), applying the invention here described only to those subcarriers, therefore performing quasi-ideal OOK transmission without wasting energy.

In one or more embodiments, power loading (e.g., in case of Additive White Gaussian Noise, AWGN) may be obtained using the "water-filling" or "water-pouring" technique. In this context, the poorer is the channel gain of a certain subcarrier, the lower is the power allocated there, with respect to the other tones. The lower is the signal-to-noise ratio, the higher is the power allocated to subcarriers with higher gain. In some embodiments, power may not be allocated at all to subcarriers with channel gain falling below a certain threshold.

Additionally, the choice of the QAM constellation (e.g., 16-QAM or 64-QAM) may be relevant in case of fading. For instance, in case the channel gain is low, a large QAM constellation (e.g., 64-QAM in case of Wi-Fi) may be avoided. Even more, when sub-optimal channel codes like the Viterbi one are used, the reception of many bits with likelihood around zero may spoil the free distance of the code. Therefore, the size of the QAM constellation on those tones that are affected by deep fading may be reduced. In case the most robust BPSK constellation is still too weak to bear the fading at one subcarrier, that subcarrier should not be used.

In one or more embodiments, power and bit loading may be implemented by switching off the less favorable channel tones, and transmitting with uniform power and modulation order elsewhere. With this simplified approach, a WUR transmitter according to one or more embodiments may take advantage of this feature, in so far as out-of-band subcarriers (and in-band subcarriers in case of logical zero, as well) may be artificially marked as if they were affected by deep fading. As a result, unnecessary transmission of the innermost QAM symbols in place of the (0+0j) symbol may be avoided, thus obtaining the "unconstrained spectrum" exemplified in FIG. 2.

One or more embodiments involving a conventional IEEE 802.11 Wi-Fi transmitter 1 for generating OOK-interpretable signals for a WuR receiver may face additional constraints on the possible waveforms to transmit due to the operation of the convolutional encoder 104 and the puncturer block 106. For instance, in conventional Wi-Fi transmitters, the application delivers to the Wi-Fi transmitter sequences of bits BITS_IN which are eventually converted into a corresponding sequence of symbols (e.g., QAM symbols) to be transmitted.

Therefore, one or more embodiments aiming at the transmission of an OOK-interpretable signal may not directly set symbols, but may involve determining one or more sequences of bits that, once processed by the Wi-Fi transmitter 1 (e.g., after scrambling at 102, encoding at 104, puncturing at 106, interleaving at 108, etc.) may result to be mapped on one or more respective symbols suitable to transmit an OOK signal for reception by a WuR receiver.

One or more embodiments may rely on certain algorithms to determine suitable sequences of bits BITS_IN which, once processed as exemplarily described with reference to FIG. 1, may generate OFDM symbols with either high or low energy within the WuR band.

Many sequences of bits BITS_IN can be used by a WuR transmitter to generate an OOK signal. For instance, considering a 64-QAM transmission over 48 tones, with a Rc=¾ channel code (as in the case of the 802.11g 54 Mbits/s data rate), since every OFDM symbol carries $48*\log_2(64)=288$ coded bits, the information bits for each OFDM symbol are $288*¾=216$. Considering that 6 bits can be used to terminate the codewords, each OFDM symbol may carry 210 bits that the WuR transmitter can freely set to "shape" the OOK waveform. The number of possible sequences is then $2^{210}$. A small portion of them will have the shape exemplified in FIG. 2, i.e., may provide improved performance. The probability of drawing one of these sequences randomly, considering the availability of four inner/outer valid corners in a 64-QAM symbol for every tone, can be estimated as $(4/64)^{48}=2^{-192}$.

In the example considered herein, the expected number of "optimal" sequences corresponding to logical bit 1 is equal to $2^{210}*2^{-192}=262144$, and other 262144 corresponding to logical bit 0. Such "optimal" sequences may hardly be found by a brute-force algorithm exploring all the $2^{210}$ possibilities, or by drawing them randomly (the probability of success being about $2^{-192}$).

Therefore, one or more embodiments may rely on a search algorithm for efficiently searching for "optimal" sequences in a satisfactory time.

Figure 4:
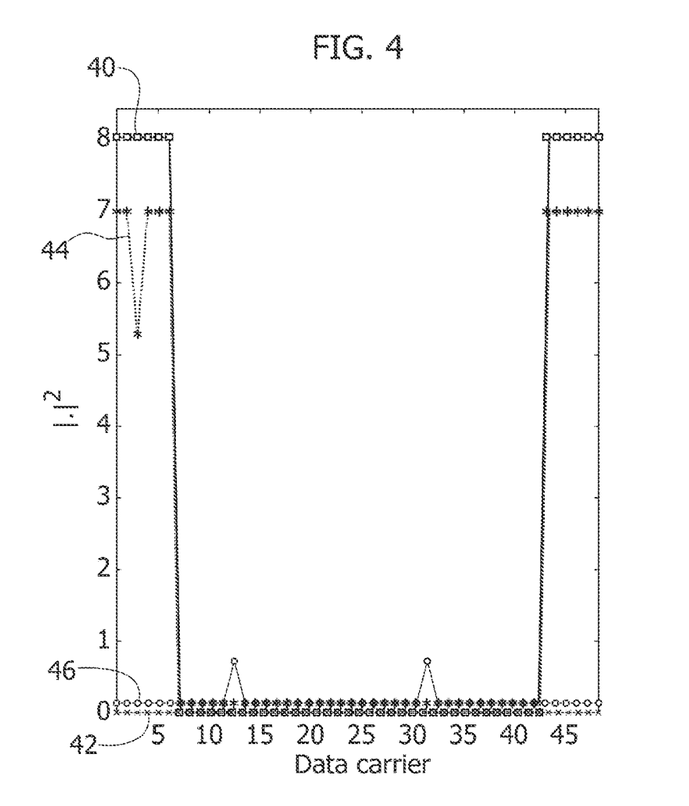
FIG. 4 is another diagram exemplary of a comparison between an unconstrained spectrum and a spectrum constrained to the use of QAM symbols for IEEE 802.11g OFDM data carriers suitable for generating a wake-up radio signal in one or more embodiments.

One or more embodiments may (additionally or alternatively) rely on "suboptimal" solutions like that exemplified in FIG. 4. The number of "suboptimal" sequences may be even greater than the number of "optimal" ones.

In one or more embodiments, every pair of bit sequences BITS_IN that—once encoded by a conventional IEEE 802.11 transmitter—results in a corresponding pair of OFDM symbols with different energy levels within the desired WuR band may be suited to carry a WuR signal (e.g., interpreted by an OOK receiver). For instance, sequences corresponding to symbols with higher energy may correspond to a logical value 1, and sequences corresponding to symbols with lower energy may correspond to a logical value 0. In one or more embodiments, the larger the distance between these two energy levels is, the better the packet-error-rate (PER) at a given SNR is, or the smaller the operating SNR for a given PER is. Among all these sequences, just a few ones can be considered as "optimal".

In one or more embodiments, sequences BITS_IN may be selected which satisfy the following selection rules.

i) Among the overall set of subcarriers within an OFDM symbol, a few of them cannot be modified (i.e., are not suitable for selection) since they correspond to pilot symbols used by conventional 802.11g receivers to track the phase error; for instance, in 802.11g, they are four, located at indexes −21,−7,+7,+21.

ii) Some subcarriers (e.g., subcarriers at DC and/or subcarriers around the Nyquist frequency) may be switched off, as stated in the 802.11g standard amendment.

iii) Within the remaining subcarriers (e.g., 48 subcarriers in 802.11g), a subset of W active subcarriers may fall within the desired signal bandwidth of the WuR system (e.g., W=12 in the example considered herein, with subcarriers ranging from −6 to +6, since the DC may not be used). A smaller value of W may result in the WuR design being easier (and less power hungry), while a larger value of W may provide improved robustness against channel fading. The overall energy of these in-band symbols may be as high as possible in case of logical 1, and as low as possible in case of logical 0. A larger distance between these two energy levels may advantageously lead to a smaller probability of wrong decision. Therefore:

in case of logical 1, all the transmitted symbols may belong to the subset of QAM symbols with maximal energy, i.e., the four external corners in the I/Q plane. For instance, in the exemplary case of the 64-QAM of FIG. 3, represented over an integer, square grid, they should belong to the subset: 7+7j, 7−7j, −7+7j, −7−7j. If this condition cannot be fulfilled, these symbols may have energy as high as possible.

in case of logical 0, all the transmitted symbols may belong to the subset of QAM symbols with minimal energy, i.e., they may belong to the subset: 1+j, 1−j, −1+j, −1−j (again with reference to the exemplary case of a QAM constellation represented over an integer, square grid, like that of FIG. 3). If this condition cannot be fulfilled, these symbols may have energy as low as possible.

iv) Energy transmitted in the other subcarriers (i.e., subcarriers which are out-of-band for the WuR signal) may be minimized, in so far as out-of-band signals waste the transmitted energy and the performance of the WuR receiver may be affected by out-of-band signals, because low-power analog filters with reduced complexity may not completely filter them. Therefore, out-of-band symbols may be selected belonging to the subset: 1+j, 1−j, −1+j, −1−j (again with reference to the exemplary case of a QAM constellation represented over an integer, square grid, like the one of FIG. 3). If this condition cannot be fulfilled, these symbols should have energy as low as possible.

v) OFDM symbols designed following the above constraints should be legitimate IEEE 802.11 (e.g., 802.11g) signals, i.e., there should exist a sequence of information bits BITS_IN that, once processed by a conventional transmitter (except for the scrambler), generates that signal.

Sequences generated following the above constraints (see, for instance, FIGS. 2 and 4) may comply with the IEEE 802.11 standard and provide satisfactory performance of a WuR system.

For instance, in case of IEEE 802.11g transmission with data rate of 54 Mbit/s (48 data carriers, 64-QAM constellation, Rc=¾), two exemplary sequences may be identified, which generate OFDM symbols with high or low energy, respectively, within the WuR band, which are provided herein as purely illustrative, non limiting examples.

Exemplary input sequence for high energy symbol:
BITS_IN=01111110001011111100010110011101010010
1001100100100
0001010110000011011011111011110001010010100000
00001110011110010110011011111001011001101
1100111100010011110001100111110000010011001011000
010110000111101000100001 0101101011110

Exemplary input sequence for low energy symbol:
BITS_IN=01111110001011111100010110011101010010
1001100100100
1111111001001000110011011100001010111000010111100
111000010010110101011011 0010010011110

By way of example, neglecting the operation of the scrambler 102 as exemplified by the dotted arrow in FIG. 1 and thus assuming that the two above-presented sequences are directly fed to the convolutional encoder 104, the output symbols generated by the frequency mapper 112 would match the two "constrained" energy profiles 24 and 26 of FIG. 2, respectively. However, the time to find such an optimal solution, i.e., a sequence of bits BITS_IN generating the target (high or low energy) OFDM symbol as exemplified in FIG. 2, may not be acceptable, even in case the search is done by an efficient algorithm.

In other cases (e.g., 48 data carriers, 64-QAM, Rc=⅔), a solution like the one exemplified in FIG. 2 may not even exist (i.e., it may not be generated by any input bit sequence). It is noted that, in one or more embodiments, sub-optimal patterns may be used, e.g., as exemplified in FIG. 4, wherein:

reference numerals 40 and 42 refer to energy levels corresponding to unconstrained transmission of a bit=1 and a bit=0, respectively, and reference numerals 44 and 46 refer to energy levels corresponding to constrained transmission of a bit=1 and a bit=0, respectively.

Notably, the above algorithm is able to minimize, or almost minimize, the out-of-band energy for several bandwidths. Thus, we may consider the bandwidth of the system tunable according to the need. In one or more embodiments, the bandwidth could be set to, e.g., about 2 MHz, 4 MHz or 8 MHz. The capability of minimizing the out-of-band signal should be greatly beneficial to mitigate the out-of-band interference, typically detrimental in WuR systems due to the low-power implementation of filters. Furthermore, minimizing the out-of-band signals helps fulfill the spectral emission constraints imposed by standards and regulatory domains, without performing any backoff (derating) of the transmitted power.

Figure 5:
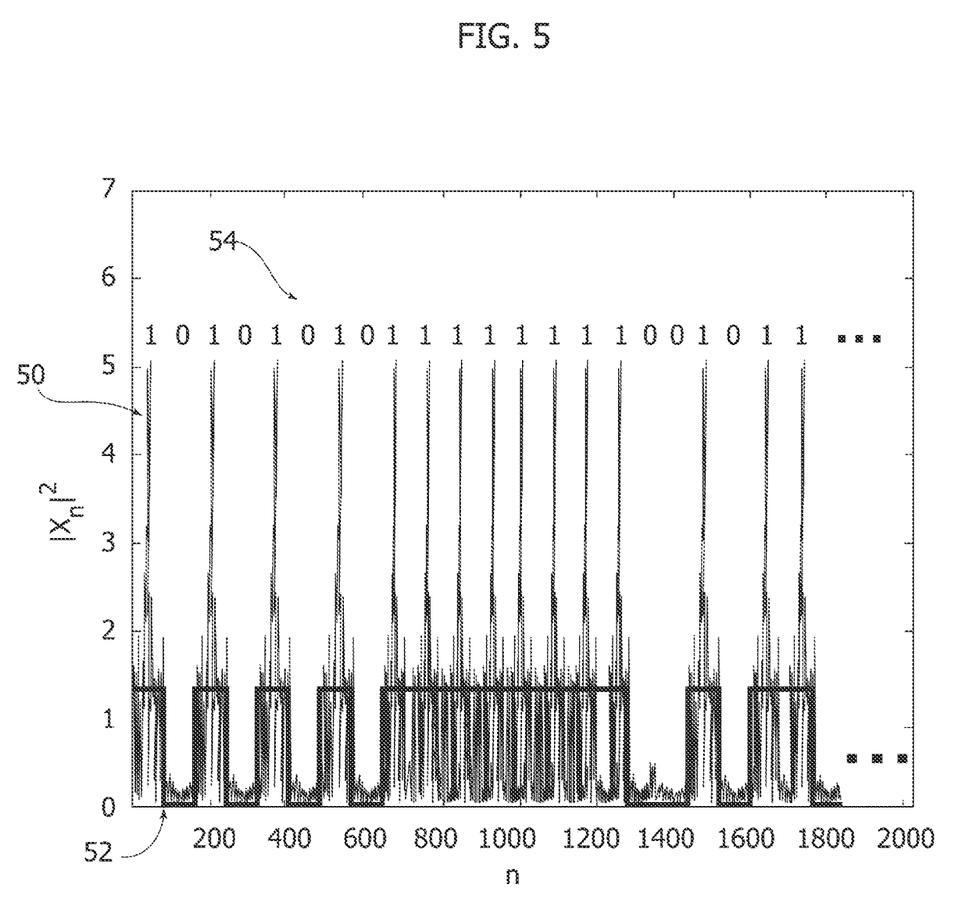
FIG. 5 is exemplary of signals in one or more embodiments.
Figure 6A:
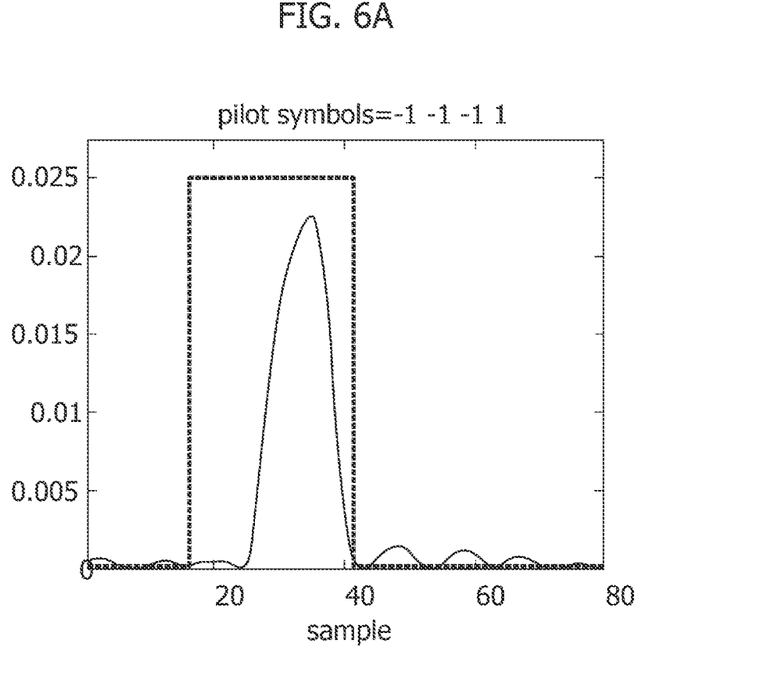
FIGS. 6A to 6D are exemplary of possible OOK pulses transmitted in one or more embodiments.
Figure 6B:
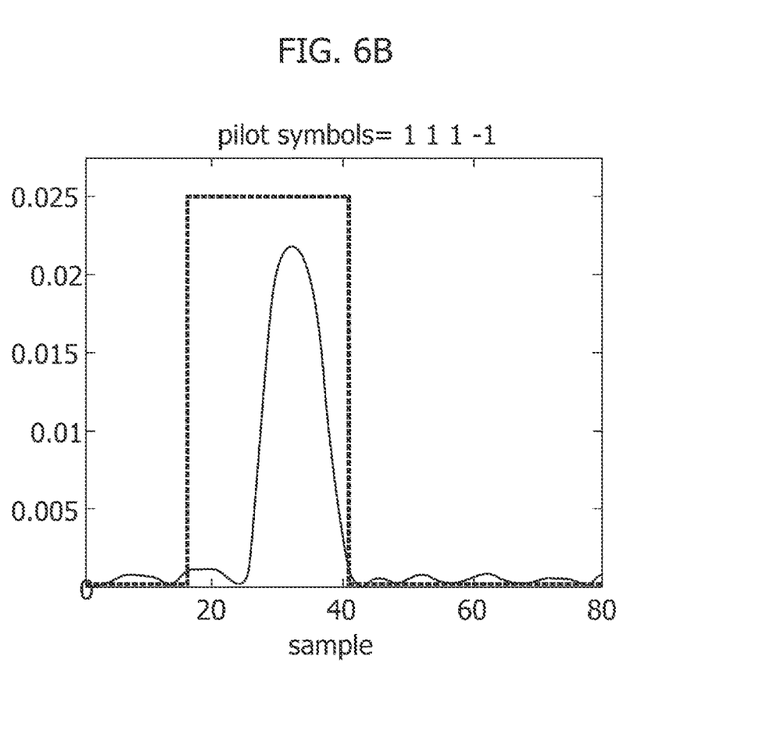
Figure 6C:
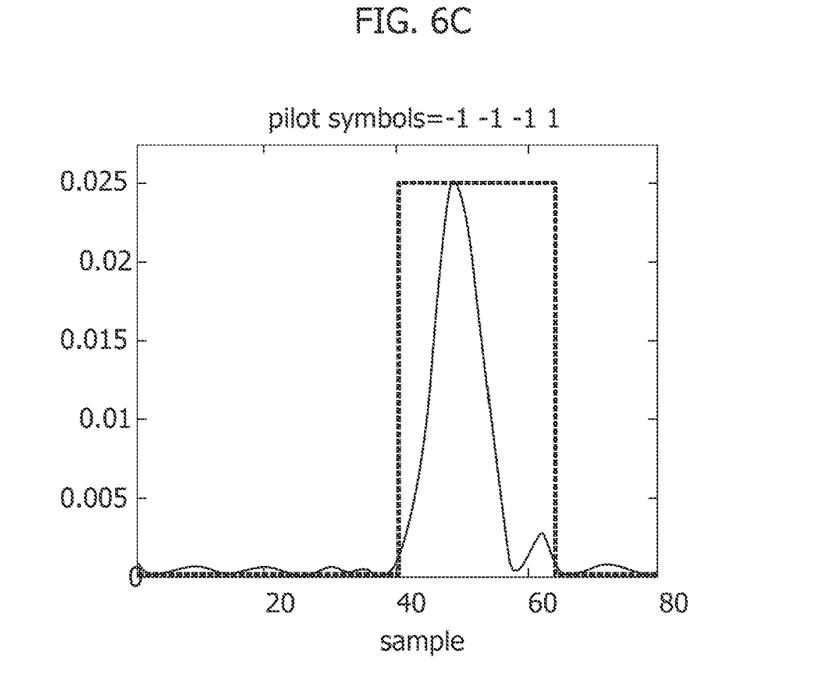
Figure 6D:
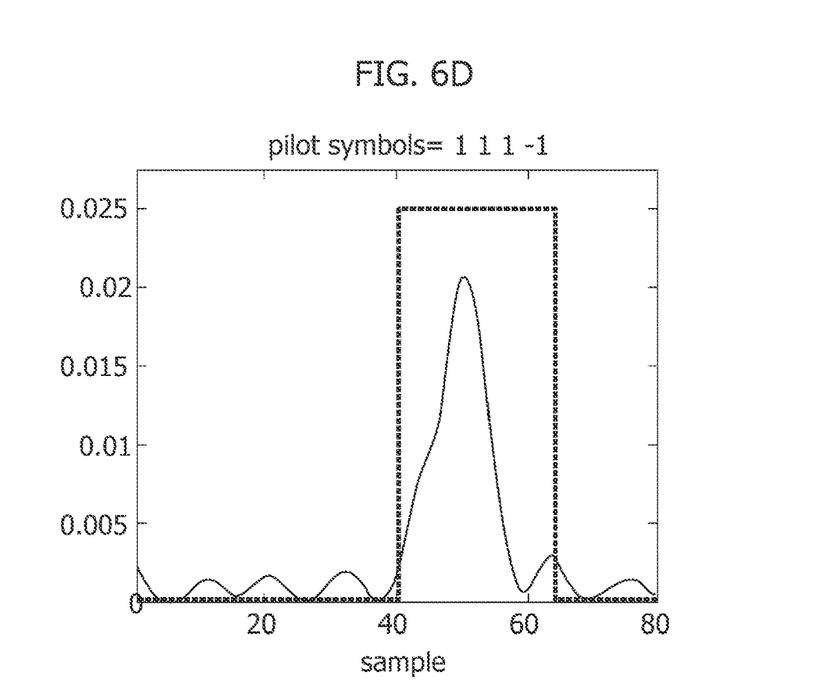

In one or more embodiments, generating one OFDM symbol with either high or low energy (representing a single bit, respectively 1 or 0, to be transmitted to a WuR receiver) within a target band as described above may not be sufficient for generating a wake-up call signal. In order to generate a valid wake-up call signal (or waveform), a (continuous) stream of OFDM symbols—corresponding to a sequence of bits equal to 1 or 0 in the wake-up call signal—may be transmitted. For instance, FIG. 5 is exemplary of a sequence of transmitted OFDM symbols, which may form an OOK modulated signal validly interpreted by a WuR receiver as a wake-up bit sequence. In particular, the square modulus of a transmitted waveform is indicated with reference numeral 50, the corresponding average OFDM symbol power is indicated with reference numeral 52, and the corresponding sequence of bits in the wake-up call signal is indicated with reference numeral 54.

In one or more embodiments, transmitting a sequence of OFDM symbols (which may be indicated as a whole as an OFDM frame or WLAN frame) corresponding to an OOK modulated signal validly interpreted by a WuR receiver may involve additional constraints on the selected input bit sequence BITS_IN.

For instance, a convolutional encoder 104 (e.g., a Viterbi encoder) in a conventional Wi-Fi transmitter typically processes a data sequence that in general is not limited to one OFDM symbol. While the standard assumes that the initial and final trellis states should be 0, the trellis state is generally not reset when a new OFDM symbol starts in the middle of the payload of an OFDM frame, e.g., in order not to spoil throughput.

In case no actions are taken, this fact may prevent correct transmission of more than one sequence of bits generating a valid OOK signal (like those previously described) since their design assumed that the initial trellis state was 0. Therefore, one or more embodiments may involve forcing the trellis status back to 0 at the end of (each) OFDM symbol in an OFDM frame, e.g., adding the constraint that the last $\log_2(N_s)$ bits of the sequences should be all 0, where Ns is the number of trellis states (e.g., 64 in the IEEE 802.11g amendment).

Additionally or alternatively, one or more embodiments may involve searching for sequences assuming an initial trellis state and ending up with a final trellis state different from 0, provided that the initial trellis state and the final trellis state match.

Additionally or alternatively, one or more embodiments may involve computing (e.g., pre-computing) a plurality of sequences, each of these sequences having a certain initial trellis state $S_{init}$ (e.g., with each sequence in the plurality of sequences having a different initial trellis state $S_{init}$), and selecting for the k-th OFDM symbol a sequence having the initial state $S_{init}(k)$ equal to the final trellis state $S_{final}(k-1)$ of the previous OFDM symbol, regardless of $S_{final}(k)$.

In one or more embodiments, the last 6 bits of the determined sequences may be fixed. Thus, for the sake of simplicity only, hereinafter the sequences will be considered to be 6 bits shorter, with the termination bits being appended at the end thereof.

In one or more embodiments, the Data Field content (e.g., the payload) of an OFDM frame may not be completely filled by the determined sequences.

For instance, the first two octets (i.e., the Service Field) may remain fixed and may comprise 7 bits set to zero used to remove the scrambling sequence.

Following the Service Field, the so called Physical Layer Convergence Procedure (PLCP) Service Data Unit (PSDU) may contain the actual information to transmit in an OFDM frame. For instance, according to the IEEE 802.11g standard, the first 24 octets of the PSDU are dedicated to the MAC header. According to the IEEE 802.11n standard, the number of octets dedicated to the MAC header may be greater. Additionally, as previously described, additional 6 bits may be necessary to reset the Viterbi state before a new OFDM symbol starts. Therefore, one (or possibly more than one) OFDM symbol at the beginning of the payload (i.e., the OFDM frame) cannot be used to carry the WuR wake-up call signal.

Depending on the communication parameters, a variable number of padding bits may be added, in order to synchronize the transmission of the first bit in a wake-up call signal with the beginning of a new OFDM symbol in the OFDM frame. In particular, the number of padding bits may be equal to $$(-16-8 \cdot N_{MAC\_octets}+6) \bmod (N_{data\_carriers} \cdot \log_2 (M_{QAM}) \cdot R_c)$$

wherein the mod function returns the positive remainder, $N_{MAC\_octets}$ is the number of octets dedicated to the MAC, $N_{data\_carriers}$ is the number of data carriers (e.g., 48), $M_{QAM}$ is the cardinality of the QAM constellation and Rc is the code rate after puncturing.

By way of example, a valid WuR wake-up call signal may be transmitted as an OFDM frame (i.e., a sequence of OFDM symbols) as exemplified below, wherein each line represents one OFDM symbol:

| Service field | MAC header | Padding bits |
|---|---|---|
| Padding bits | | Termination bits |
| Predetermined sequence # 1 | | Termination bits |
| Predetermined sequence # 2 | | Termination bits |
| ... | | |
| Predetermined sequence # N-1 | | Termination bits |
| Predetermined sequence # N | | Termination bits |
| FCS | Termination bits | Padding bits |

In one or more embodiments, the padding bits and the bits for trellis termination to the chosen trellis state (e.g., 6 termination bits) may be prepended to the first predetermined sequence, achieving the pattern corresponding to the first two OFDM symbols exemplified above. As previously discussed, the termination status may not necessarily be 0.

As for the last OFDM symbol of the sequence exemplified above, the IEEE 802.11 standard comprises 4 octets of parity, i.e., the Frame Check Sequence (FCS), to check data integrity, and some padding bits to match a multiple of the number of bits carried by one OFDM symbol. Therefore, the above-exemplified sequence is exemplary of a sequence of OFDM symbols for generating a valid wake-up OOK signal. A corresponding modulated waveform may thus be correctly interpreted by an IEEE 802.11 "legitimate" receiver (e.g., an access point) as a valid IEEE 802.11 signal, and by a target WuR receiver as a suitable OOK sequence of bits, e.g., conveying a wake-up call signal.

In case the insertion of the MAC header, of the final FCS, of the last termination bits and of the final padding bits are left to the application and are not performed by the Wi-Fi device, one or more embodiments may generate an OOK valid signal also in the first and/or last OFDM symbols of the frame.

For instance, one or more embodiments may be configured to set a "fake" source address in the MAC header to generate a suitable bit sequence, and/or to set a destination address so that the corresponding parity bits in the last OFDM symbol (along with the padding bits) may result in a valid OOK signal, thereby possibly increasing the amount of information transferred by the sequence.

The above method to form the WuR frame is flexible, and allows to adapt the frame structure to the specific needs. For instance, one or more embodiments may be configured to transmit WuR frames with variable data rate, e.g. by applying a repetition code or a Manchester code. In one or more embodiments the frame length could vary, e.g. by inserting/removing fields such as a Cyclic Redundancy Check (CRC) code, a Message Integrity Check (MIC) code, by increasing the number of bits of each valid address at the receiver, or adding timestamps to ease synchronization.

In one or more embodiments, the input bit sequence BITS_IN may be subject to scrambling processing at 102 before being fed to the convolutional encoder 104. The data processing introduced by the scrambler block 102 may be reverted if the value loaded into the scrambling register at the beginning of the WuR frame is known. In such a case, the scrambling sequence may be (fully) predictable, and it may be sufficient to xor the predetermined sequence with the correct scrambling sequence one more times, before sending it to the scrambler, to "counter" the operation of the scrambler block 102. Given that the scrambling sequence added modulo 2 an even number of times, it may be removed. Therefore, one or more embodiments may be configured to counter operation of the scrambler block 102 to obtain, at the output of the scrambler block 102, the same predetermined sequence(s) previously described.

In one or more embodiments, the initial content of the scrambling register may not necessarily be set by the application, and the Wi-Fi transmitter may be configured to reading such initial content.

In case the register content is not accessible at all, to achieve correct transmission of the WuR sequence, one or more embodiments may be configured to repeat a whole WuR sequence in the PSDU, either for each possible scrambling phase (e.g., 127 times), or drawing at random the scrambling phase even a greater number of times.

In case the application is not able to add the scrambling sequence to the whole Data Field (typically, the Service Field if formed by the transmitter and is not accessible to the application), (only) the portion of the PSDU corresponding with trellis terminations, predetermined sequences, and—optionally—the initial padding may be scrambled twice, while the Service Field, the MAC header, and the FCS may remain unchanged.

For the sake of brevity, the use of a convolutional (e.g., Viterbi) encoder/decoder 104 was assumed in the present detailed description.

Alternatively, one or more embodiments may involve amendments of the IEEE 802.11 standard, e.g., the IEEE 802.11n standard, which support advanced channel coding based on low-density-parity-check (LDPC) codes. LDPC codes are block codes, therefore they do not need an interleaver, in contrast to convolutional codes. The size of LDPC codewords foreseen by the standard may match the number of bits of one OFDM symbol. Therefore, one or more embodiments may apply to LDPC.

One or more embodiments may involve a multiple-input-multiple-output (MIMO) system, e.g., as supported by IEEE 802.11n and subsequent amendments. In such case, one or more embodiments may be configured to generate a WuR signal for every antenna spatial stream, space-time stream (in case of space-time block codes), and TX chain (in case of beamforming), and let them combine at the receiver, e.g., with the effect of reducing channel fading.

It is noted that many bit sequences BITS_IN (possibly, millions or more) may generate OOK signals with the same spectrum. However, it is noted that in the time domain different sequences may result in different waveforms, with some of these waveforms possibly improving the performance of the WuR receiver. For instance, some sequences may facilitate the synchronization process more than others, or may provide a better Peak-to-Average Power Ratio (PAPR).

It is noted that some sequences may generate waveforms in the time domain with a relevant fraction of energy either in the first or second half of the OFDM symbol, for both pilot polarities. For instance, FIGS. 6A to 6D are exemplary of OOK pulses with a relevant fraction of energy either in the first half of the OFDM symbol—see, e.g., FIGS. 6A and 6B—or in the second half of the OFDM symbol—see, e.g., FIGS. 6C and 6D—for both pilot polarities. In FIGS. 6A to 6D, on the abscissa scale are the 80 OFDM samples in the time domain, after IFFT and cyclic prefix insertion, and on the ordinate scale are the square of their amplitude. In such cases, one or more embodiments may apply Manchester coding, e.g., to strengthen the link robustness and to ease the receiver detection phase, without worsening the throughput. A Manchester code may map a WuR bit equal to 1 or 0 onto a pair of OOK symbols "1 0" or "0 1", respectively.

In one or more embodiments, Manchester coding may be applied also in absence of any optimization of the time-domain waveform shape, possibly resulting in a reduction (e.g., halving) of the system throughput.

Additionally or alternatively, in one or more embodiments transmission may take place at an even higher rate, e.g., by choosing (e.g., for both pilot polarities) waveforms with a majority of energy in each quarter of the OFDM symbol, therefore facilitating transmitting two bits per OFDM symbol.

In one or more embodiments, the transmission may take place by exploiting an off-the-shelf IEEE 802.11 device, generating OOK waveforms by transmitting suitable, optimized binary sequences BIT_IN, intended to WuR receivers waking-up any kind of device. E.g, not only sensors, actuators or a primary IEEE 802.11 device, but also other devices implementing different communication standards such as, among others, Bluetooth 4.x and 5.x, Bluetooth Low Energy (BLE), IEEE 802.15.4g, LTE, 4G and 5G.

As exemplified herein, a method of operating a radio transmitter (e.g., 1) configured to transmit at least one sequence of logic values (e.g., 54) targeted to at least one radio receiver by transmitting transmission signals (e.g., 50) selected in a constellation diagram (e.g., 30) having a certain cardinality may comprise selecting said transmission signals out of a first subset (e.g., L) of transmission signals in said constellation diagram, said first subset comprising a first number of transmission signals, and a second subset (e.g., H) of transmission signals in said constellation diagram, said second subset comprising a second number of transmission signals.

As exemplified herein, the transmission signals in the second subset of transmission signals may have an energy higher than the transmission signals in the first subset of transmission signals, and the sum of said first number of transmission signals and said second number of transmission signals may be less than said cardinality.

As exemplified herein, said at least one sequence of logic values may comprise logic values selected out of a first logic value and a second logic value, and a method may comprise:

transmitting a transmission signal out of said first subset of transmission signals to transmit said first logic value, and transmitting a transmission signal out of said second subset of transmission signals to transmit said second logic value.

As exemplified herein, the transmission signals in the first subset of transmission signals may have a minimal energy amongst the transmission signals in said constellation diagram, and the transmission signals in the second subset of transmission signals may have a maximal energy amongst the transmission signals in said constellation diagram.

As exemplified herein, said constellation diagram of transmission signals may comprise quadrature amplitude modulated (QAM) transmission signals arranged in a matrix comprising a plurality of rows and columns, the transmission signals in the first subset of transmission signals may be arranged at the center of said matrix, and the transmission signals in the second subset of transmission signals may be arranged at the vertexes of said matrix.

As exemplified herein, the radio transmitter may be a Wi-Fi radio transmitter configured to:

operate according to an IEEE 802.11 standard, preferably one of the 802.11g, 802.11a, 802.11n, 802.11ac and 802.11ax standards, and apply orthogonal frequency division multiplexing, OFDM, to transmit said transmission signals.

As exemplified herein, the radio transmitter may be configured to select said transmission signals by implementing a certain mapping function of sequences of input bits (e.g., BITS_IN) supplied to said radio transmitter into transmission signals in said constellation diagram having said certain cardinality, and a method may comprise selecting said sequences of input bits supplied to said radio transmitter as sequences mapped by said certain mapping function into transmission signals from the first subset of transmission signals and the second subset of transmission signals.

As exemplified herein, selecting said sequences of input bits mapped into transmission signals may comprise forcing to zero the last $\log_2(Ns)$ bits of said sequences of input bits, wherein Ns is a number of possible trellis states of said sequences of input bits.

As exemplified herein, selecting said sequences of input bits mapped into transmission signals may comprise selecting said sequences of input bits having an initial trellis state and a final trellis state equal to each other.

As exemplified herein, selecting said sequences of input bits mapped into transmission signals may comprise selecting each sequence of input bits having an initial trellis state equal to a final trellis state of a previous sequence of input bits supplied to said radio transmitter.

As exemplified herein, a method may comprise transmitting at least one initialization transmission signal at the beginning of said at least one sequence of logic values, and inserting a certain number of padding bits in a sequence of input bits mapped into said initialization transmission signal.

As exemplified herein, said initialization transmission signal may comprise a header field, and a method may comprise setting a value of said header field and/or setting values of said padding bits to transmit a logic value of said at least one sequence of logic values with transmission of said initialization transmission signal.

As exemplified herein, a method may comprise transmitting at least one termination transmission signal at the end of said at least one sequence of logic values, the termination transmission signal comprising a parity field, and setting a value of said parity field to transmit a logic value of said at least one sequence of logic values with transmission of said termination transmission signal.

As exemplified herein, the radio transmitter may comprise a scrambling register configured to apply scrambling processing (e.g., 102) to the sequences of input bits supplied thereto, and a method may comprise:

reading a value stored in said scrambling register at the beginning of said transmission of transmission signals, compute a scrambling sequence as a function of said value read at the beginning of said transmission of transmission signals, and apply XOR processing between said scrambling sequence and said sequences of input bits supplied to said radio transmitter.

As exemplified herein, a method may comprise applying Manchester coding to said at least one sequence of logic values targeted to the at least one radio receiver.

As exemplified herein, a radio transmitter may be configured to transmit at least one sequence of logic values targeted to at least one radio receiver by transmitting transmission signals selected in a constellation diagram having a certain cardinality, wherein:

said transmission signals are selected out of a first subset of transmission signals in said constellation diagram, said first subset comprising a first number of transmission signals, and a second subset of transmission signals in said constellation diagram, said second subset comprising a second number of transmission signals, the transmission signals in the second subset of transmission signals have an energy higher than the transmission signals in the first subset of transmission signals, the sum of said first number of transmission signals and said second number of transmission signals is less than said cardinality, and the radio transmitter may be configured to operate according to a method as exemplified herein.

Without prejudice to the underlying principles, the details and embodiments may vary, even significantly, with respect to what has been described by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a radio transmitter, the method comprising:

selecting transmission signals out of a first subset of transmission signals in a constellation diagram and out of a second subset of transmission signals in said constellation diagram, said first subset including a first number of transmission signals and said second subset including a second number of transmission signals, wherein:
the transmission signals in the second subset of transmission signals have an energy higher than the transmission signals in the first subset of transmission signals, and
the sum of said first number of transmission signals and said second number of transmission signals is less than a cardinality of the constellation diagram; and
transmitting at least one sequence of logic values targeted to at least one radio receiver by transmitting the selected transmission signals.

2. The method of claim 1, wherein:
said at least one sequence of logic values comprises logic values selected out of a first logic value and a second logic value;
transmitting said at least one sequence of logic values includes transmitting a first transmission signal out of said first subset of transmission signals to transmit said first logic value; and
transmitting said at least one sequence of logic values includes transmitting a second transmission signal out of said second subset of transmission signals to transmit said second logic value.

3. The method of claim 1, wherein the transmission signals in the first subset of transmission signals have a minimal energy amongst the transmission signals in said constellation diagram, and the transmission signals in the second subset of transmission signals have a maximal energy amongst the transmission signals in said constellation diagram.

4. The method of claim 1, wherein:
said constellation diagram of transmission signals comprises quadrature amplitude modulated transmission signals arranged in a matrix that includes a plurality of rows and columns, a center, and vertexes;
transmission signals in the first subset of transmission signals are arranged at the center of said matrix; and
transmission signals in the second subset of transmission signals are arranged at the vertexes of said matrix.

5. The method of claim 1, wherein the radio transmitter is a Wi-Fi radio transmitter configured to operate according to an IEEE 802.11 standard, the method including
applying orthogonal frequency division multiplexing (OFDM) to said selected transmission signals, wherein transmitting the selected transmission signals includes transmitting the selected transmission signals after applying OFDM to said selected transmission signals.

6. The method of claim 1, wherein selecting said transmission signals includes implementing a mapping function of sequences of input bits supplied to said radio transmitter into transmission signals from the first subset of transmission signals and the second subset of transmission signals.

7. The method of claim 6, wherein implementing the mapping function of said sequences of input bits comprising forcing to zero the last $\log_2(Ns)$ bits of said sequences of input bits, wherein Ns is a number of possible trellis states of said sequences of input bits.

8. The method of claim 6, wherein implementing the mapping function of said sequences of input bits comprises selecting said sequences of input bits having an initial trellis state and a final trellis state equal to each other.

9. The method of claim 6, wherein implementing the mapping function of said sequences of input bits comprises selecting each sequence of input bits having an initial trellis state equal to a final trellis state of a previous sequence of input bits supplied to said radio transmitter.

10. The method of claim 6, comprising transmitting initialization transmission signal at the beginning of said at least one sequence of logic values, and inserting a certain number of padding bits in the sequence of input bits mapped into said initialization transmission signal.

11. The method of claim 10, wherein said initialization transmission signal comprises a header field, the method comprising setting at least one of a value of said header field or values of said padding bits to transmit a logic value of said at least one sequence of logic values with transmission of said initialization transmission signal.

12. The method of claim 6, comprising:
transmitting termination transmission signal at the end of said at least one sequence of logic values, the termination transmission signal including a parity field; and
setting a value of said parity field to transmit a logic value of said at least one sequence of logic values with transmission of said termination transmission signal.

13. The method of claim 6, wherein the radio transmitter comprises a scrambling register configured to apply scrambling processing to the sequences of input bits, the method comprising:
reading a value stored in said scrambling register;
compute a scrambling sequence as a function of the value read from the scrambling register; and
apply XOR processing between said scrambling sequence and said sequences of input bits.

14. The method of claim 1, comprising applying Manchester coding to said at least one sequence of logic values prior to transmitting the at least one sequence of logic values targeted to the at least one radio receiver.

15. A radio transmitter, comprising:
a selection circuit configured to select transmission signals out of a first subset of transmission signals in a constellation diagram, and out of a second subset of transmission signals in said constellation diagram, said first subset including a first number of transmission signals and said second subset including a second number of transmission signals, wherein:
the transmission signals in the second subset of transmission signals have an energy higher than the transmission signals in the first subset of transmission signals, and
the sum of said first number of transmission signals and said second number of transmission signals is less than a cardinality of the constellation diagram; and
a transmission circuit configured to transmit at least one sequence of logic values targeted to at least one radio receiver by transmitting the selected transmission signals.

16. The radio transmitter of claim 15, wherein:
said at least one sequence of logic values comprises logic values selected out of a first logic value and a second logic value; and
the selected transmission signals includes a first transmission signal selected for said first logic value and a second transmission signal for said second logic value.

17. The radio transmitter of claim 15, wherein the selection circuit is configured to select said transmission signals by implementing a mapping function of sequences of input bits supplied to said radio transmitter into transmission signals from the first subset of transmission signals and the second subset of transmission signals, the radio transmitter further comprising a scrambling register configured to apply scrambling processing to the sequences of input bits.

18. A method of operating a radio transmitter, the method comprising:

selecting, for a first logic input, a first transmission signal out of a first subset of transmission signals in a constellation diagram;

selecting, for a second logic input, a first transmission signal out of a second subset of transmission signals in said constellation diagram, said first subset including a first number of transmission signals and said second subset including a second number of transmission signals, wherein:

the transmission signals in the second subset of transmission signals have an energy higher than the transmission signals in the first subset of transmission signals, and the sum of said first number of transmission signals and said second number of transmission signals is less than a cardinality of the constellation diagram; and transmitting the first and second logic values targeted to at least one radio receiver by transmitting the first and second transmission signals, respectively.

19. The method of claim 18, wherein the transmission signals in the first subset of transmission signals have a minimal energy amongst the transmission signals in said constellation diagram, and the transmission signals in the second subset of transmission signals have a maximal energy amongst the transmission signals in said constellation diagram.

20. The method of claim 18, wherein the radio transmitter is a Wi-Fi radio transmitter configured to operate according to an IEEE 802.11 standard, the method including applying orthogonal frequency division multiplexing (OFDM) to the first and second transmission signals, wherein transmitting the first and second transmission signals includes transmitting the first and second transmission signals after applying OFDM to the first and second transmission signals.

* * * * *